United States Patent
Batraev et al.

(10) Patent No.: US 12,066,898 B2
(45) Date of Patent: Aug. 20, 2024

(54) SYSTEM AND METHOD FOR DISTRIBUTED-AGENT RESTORATION OF VIRTUAL MACHINES

(71) Applicant: Acronis International GmbH, Schaffhausen (CH)

(72) Inventors: Victor Batraev, Sofia (BG); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 154 days.

(21) Appl. No.: 17/301,256

(22) Filed: Mar. 30, 2021

(65) Prior Publication Data
US 2022/0318096 A1    Oct. 6, 2022

(51) Int. Cl.
*G06F 11/14*        (2006.01)
*G06F 8/61*         (2018.01)
*G06F 9/455*        (2018.01)

(52) U.S. Cl.
CPC ............ *G06F 11/1451* (2013.01); *G06F 8/61* (2013.01); *G06F 9/45558* (2013.01); *G06F 2009/45595* (2013.01)

(58) Field of Classification Search
CPC .... G06F 11/1451; G06F 8/61; G06F 9/45558; G06F 2009/45595
USPC .................................. 711/162, 161
See application file for complete search history.

(56) References Cited

U.S. PATENT DOCUMENTS

| | | | |
|---|---|---|---|
| 9,015,121 B1 | 4/2015 | Salamon et al. | |
| 9,652,178 B2 | 5/2017 | Mohl | |
| 9,740,577 B1 | 8/2017 | Chakraborty et al. | |
| 9,858,154 B1 | 1/2018 | Lyadvinsky et al. | |
| 10,503,604 B2 | 12/2019 | Anami et al. | |
| 10,705,917 B2 | 7/2020 | Deshmukh et al. | |
| 2009/0313447 A1* | 12/2009 | Nguyen | G06F 9/45558 718/1 |
| 2009/0328030 A1* | 12/2009 | Fries | G06F 8/63 717/174 |
| 2010/0011178 A1* | 1/2010 | Feathergill | G06F 11/1466 711/E12.103 |
| 2010/0146501 A1* | 6/2010 | Wyatt | G06F 21/84 718/1 |

(Continued)

FOREIGN PATENT DOCUMENTS

EP         2494456         9/2016

OTHER PUBLICATIONS

Laura Dubois et al: "Backup and Recovery: Accelerating Efficiency and Driving Down IT Costs Using Data Deduplication", IDC #221849, Feb. 1, 2010, XP055143053, Retrieved from the Internet: URL: http://www.emcsource.net/collateral/analyst-reports/idc-20090519-data-deduplication.pdf.

(Continued)

*Primary Examiner* — David Yi
*Assistant Examiner* — Zubair Ahmed
(74) *Attorney, Agent, or Firm* — ESPE Legal Consultancy FZ-LLC

(57) ABSTRACT

A distributed agent for backup and restoration of virtual machines collects backup data and meta-data. The distributed agent includes an agent inside a virtual machine and an agent outside the virtual machine. The two kinds of agents communicate with each other to collect data of different types used to backup and restore virtual machines.

12 Claims, 7 Drawing Sheets

(56) References Cited

U.S. PATENT DOCUMENTS

| | | | |
|---|---|---|---|
| 2015/0378708 A1* | 12/2015 | Nagaraja | G06F 9/45558 717/177 |
| 2017/0300386 A1 | 10/2017 | Shulga et al. | |
| 2018/0285215 A1* | 10/2018 | Ashraf | G06F 11/1451 |
| 2019/0163578 A1 | 5/2019 | Anami et al. | |
| 2019/0384679 A1 | 12/2019 | Parapibil et al. | |
| 2020/0233838 A1 | 7/2020 | Morton et al. | |
| 2021/0049079 A1 | 2/2021 | Kumar et al. | |

OTHER PUBLICATIONS

European Search Report EP 21 02 0625, dated May 4, 2022.
European Search Report EP 21 02 0579 dated May 5, 2022.
U.S. Appl. No. 17/301,249, Office Action dated Jun. 28, 2022.
U.S. Appl. No. 17/301,249, Office Action dated Oct. 14, 2022.
U.S. Appl. No. 17/301,249, Advisory Action dated Feb. 28, 2023.
U.S. Appl. No. 17/301,249, Notice of Allowance dated Apr. 3, 2023.
Microsoft Corporation: "Volume Shadow Copy Service", Jul. 12, 2022, Retrieved from the Internet: https://learn.microsoft.com/en-us/windows-server/storage/file-server/volume-shadow-copy-service.
Microsoft Corporation: "Shadow Copies and Shadow Copy Sets", Jan. 8, 2021, Retrieved from the Internet: https://learn.microsoft.com/en-us/windows/win32/vss/shadow-copies-and-shadow-copy-sets.

* cited by examiner

SYSTEM AND METHOD FOR DISTRIBUTED-AGENT RESTORATION OF VIRTUAL MACHINES

TECHNICAL FIELD

The invention relates to computer-system environments that employ virtual machines, specifically the preservation and restoration of user data in such environments.

BACKGROUND

Virtual machines are employed by computer users to run certain applications. There is a need to back up these virtual machines so that files, applications, or other items may be restored from the back up if necessary. Backing up user data within these virtual machines presents a challenge, especially when granular restoration of user data is desired. A backup agent running inside the virtual machine can create backups and restore such parts of the system as are desired. Or a backup agent installed outside the virtual machine can be used to create a backup image of the virtual machine. Backups within a virtual machine consume valuable disk, CPU, and RAM resources. But backups from outside a virtual machine may not be application-aware or allow for granular restoration.

SUMMARY

A distributed agent resides partially outside the virtual machine and partially inside. The agent within the virtual machine may be relatively lightweight and thus consume fewer system resources than a full agent. The two parts of the agent communicate by way of a common management service. The distributed agent makes consistent backups, and may be used for complex applications running on one or more virtual machines.

The outside agent can make an image base backup, either full or incremental, using a public cloud or IaaS storage API or hypervisor SDK. Outside agent can then restore all or selected images for an existing virtual machine. Or the outside agent can create a new virtual machine for the restored image. The inside agent collects application-specific data or other metadata, such as file indices, system information, or processes stack trace, that may be required for browsing archives, restoring, searching, or analysis of backup data. The inside agent can also granularly restore the system, for example, by browsing backup archives, extracting and restoring data, such as files or application configurations and items.

A typical process flow includes an outside agent notifying the inside agent that a virtual-machine snapshot is imminent and waiting for confirmation from the inside agent. When an inside agent receives the command, it freezes applications, collects metadata, and sends confirmation of its readiness to the outside agent. Outside agent makes a snapshot of the virtual machine and notifies the inside agent that a snapshot has been made. Inside agent receives the notification and unfreezes the applications. If needed, the inside agent also collects additional data. Where the system includes multiple virtual machines, the outside agent notifies an inside agent for each virtual machine and waits for confirmation from each virtual machine. All agents save collected data and metadata in an integrated backup archive.

In an embodiment, a backup service and a lightweight agent installed on a target virtual machine are used to restore a system object of a virtual machine, comprising the steps of collating, with the backup service, metadata related to a granular restore task with an appropriate backup archive to produce a granular restore archive; plugging the granular restore archive into a target virtual machine as a virtual disk; sending a command from the backup service to the lightweight agent; and the lightweight agent applying a granular restore archive to the target virtual machine.

In another embodiment, the backup service captures a target virtual machine snapshot and merges the snapshot with the granular restore archive to create a restored virtual machine snapshot.

In another embodiment, the backup service converts the restored virtual machine snapshot to an image formatted for restoring the virtual machine.

In another embodiment, the backup service restores the virtual machine with the formatted image.

In alternative embodiments, the lightweight agent installs software, modifies registry keys, modifies configuration files, performs custom scripts, or decrypts data.

In another embodiment, the lightweight agent restores the virtual machine with metadata stored in a different location from the virtual machine snapshot taken by the backup service.

In another embodiment, the restoration system comprises a processor with a host running a guest virtual machine; a storage medium outside the guest virtual machine for storing a snapshot of the guest virtual machine; a first backup agent installed outside the guest virtual machine and configured to make the snapshot of the guest virtual machine; a second backup agent installed inside the guest virtual machine and configured to collect metadata defining a data structure and system object state; wherein the first and second backup agents are configured to communicate with each other; wherein the first backup agent is configured to issue commands to the second backup agent and the second backup agent collects metadata upon command from the first backup agent; and wherein metadata collected by the second backup agent is linked with the snapshot made by the first backup agent.

In another embodiment, the metadata collected by the second backup agent is stored in a different location than the snapshot made by the first backup agent.

DETAILED DESCRIPTION

Figure 1:
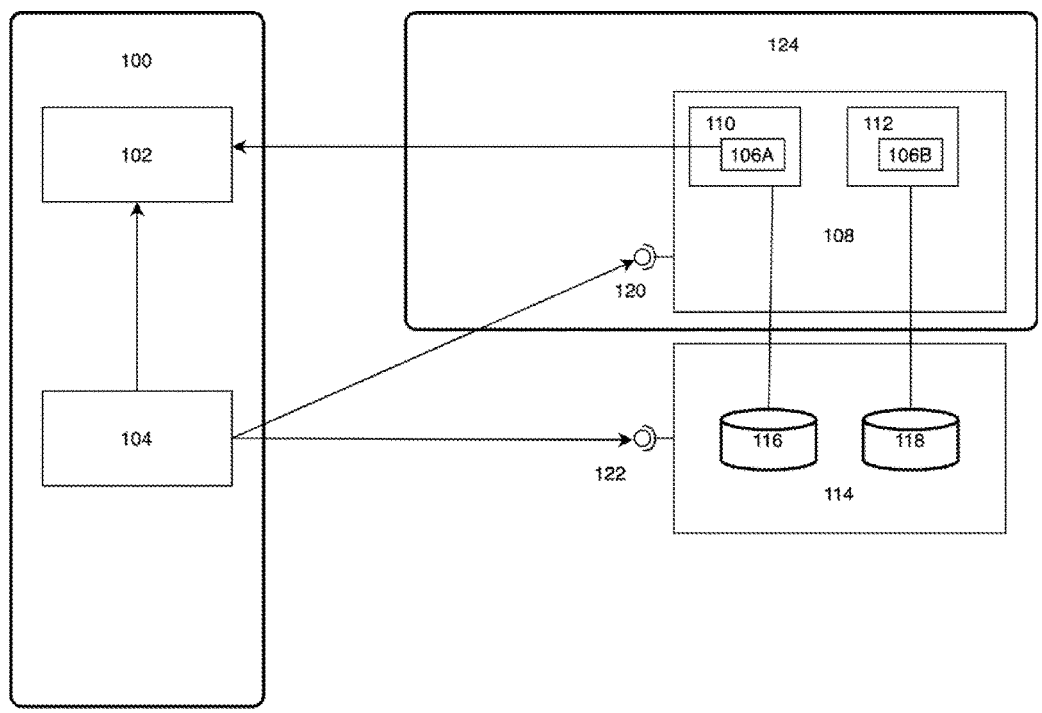
FIG. 1 shows a general implementation of the invention.

As shown in FIG. 1, backup system 100 comprises a management service 102 and first and second backup agents 104, 106. The backup system 100 interacts with a host 108 for first and second virtual machines 110, 112. Host 108 is connected to storage 114, which holds first and second virtual machine images 116, 118 corresponding to the virtual machines 110, 112. First backup agent 104 communicates with host 108 by way of host API 120 and with storage 114 by way of storage API 122. Host 108 and storage 114 reside in public cloud 124. Alternatively, an IaaS solution or hypervisor could be used in place of public cloud 124. In these alternative embodiments, an IaaS storage API or a hypervisor SDK is used instead of storage API 122. Storage 114 may be located on a different host from host 124 where virtual machines 110 and 112 are running.

First backup agent 104 represents an application that saves a full or incremental backup of virtual machines. For example, first backup agent 104 makes image backups, either full or incremental, kept in storage 114. First backup agent 104 can restore all or selected images for existing virtual machines. Or first backup agent 104 can create a new virtual machine for receiving the restored image.

Second backup agents 106A and 106B each reside in and prepare applications for backup in their respective virtual machines 110, 112. During backup, second backup agents 106A, B collect application specific data or any other meta-data (e.g. file indexes, system information, or processes stack trace) that may be useful. For example, application-specific data or other meta-data may be required for browsing backup archives, restoring virtual machine images, or analyzing backed up data. Second backup agent 106 also performs granular restoring for virtual machines 110, 112, as well as extracting and restoring data, including files or application configurations and items.

Examples of meta-data collected by second backup agent 106 include file-system metadata, memory dumps or system traces of running applications and processes, system registry keys and key values, and configuration files. Further examples are system settings, including network configuration, security access rights, and security certificates. Still further examples include scripts that change system and application states, such as running, connected, or initialized.

Virtual machines 100, 112 can be a separate set of tenant virtual machines, a group of virtual machines working on a particular hypervisor, or a group of virtual machines in a data center.

First backup agent 104 can be running on a public cloud and managed by a service provider. Second backup agent 106 is a part of tenant responsibility.

First backup agent 104 can be installed on an additional appliance, virtual machine, or any other dedicated machine.

Second backup agent 106 can be installed on any machine where granular backup is desired. For example, backup is typically needed for databases, web services, virtual desktops, containers, etc.

In use, backup system 100 can be used to create backups of virtual machines 110, 112 by scheduling a backup task that includes a predetermined set of applications or files. Other objects can be included such as processes, containers, registries, or databases. The backup task can be triggered by a start condition such as an interval of time, a specific time, or a certain system event. The management service 102 initiates the backup task when the start condition is met and selects one or more virtual machines within the scope of the task. The first backup agent 104 receives a notification about the task and prepares to run a backup. When ready to create a snapshot, first backup agent 104 notifies the second backup agent 106 and waits for confirmation from second backup agent 106. When second backup agent 106 receives the command, it freezes applications, collects any application or system data as needed, and then sends confirmation of system readiness to first backup agent 104. First backup agent 104 then makes a snapshot of one or more virtual machine images, notifies second backup agent 106 that the snapshot has been made and starts processing the snapshot. After getting a command from first backup agent 104, second backup agent 106 unfreezes frozen applications. In a system with multiple virtual machines, first backup agent 104 preferably sends notifications and waits for confirmation from all virtual machines in which second backup agent 106 is active. First and second backup agents 104, 106 save collected data and meta-data in a single backup archive for each virtual machine.

First and second backup agents 104, 106 communicate, for example, by knowing the IP address of the management service 102 and connection permissions to receive and send commands to each other and to other backup agents by way of management service 102.

First and second backup agents 104, 106 are synchronized. When a backup task starts, first backup agent 104 gets meta-data from second backup agent 106 to save an application's current state.

First backup agent 104 depends on platform API. Second backup agent 106 is cloud agnostic.

First backup agent 104 stores backup data and also restores that backup data. Second backup agent 106 collects meta-data that is used to associate or map data by application, user, process, file folder, or other operating system instances. Second backup agent 106 need not store any type of backup.

First and second backup agents 104, 106 can be customized for specific functions. For example, forensic functionality can be added by storing meta-data needed for security incident investigation and analysis. Antimalware functionality can be added by storing meta-data needed for advanced malware scanning of the backup data.

Data notarization functionality can be added by storing hashes and signatures used for backing up data.

Figure 2:
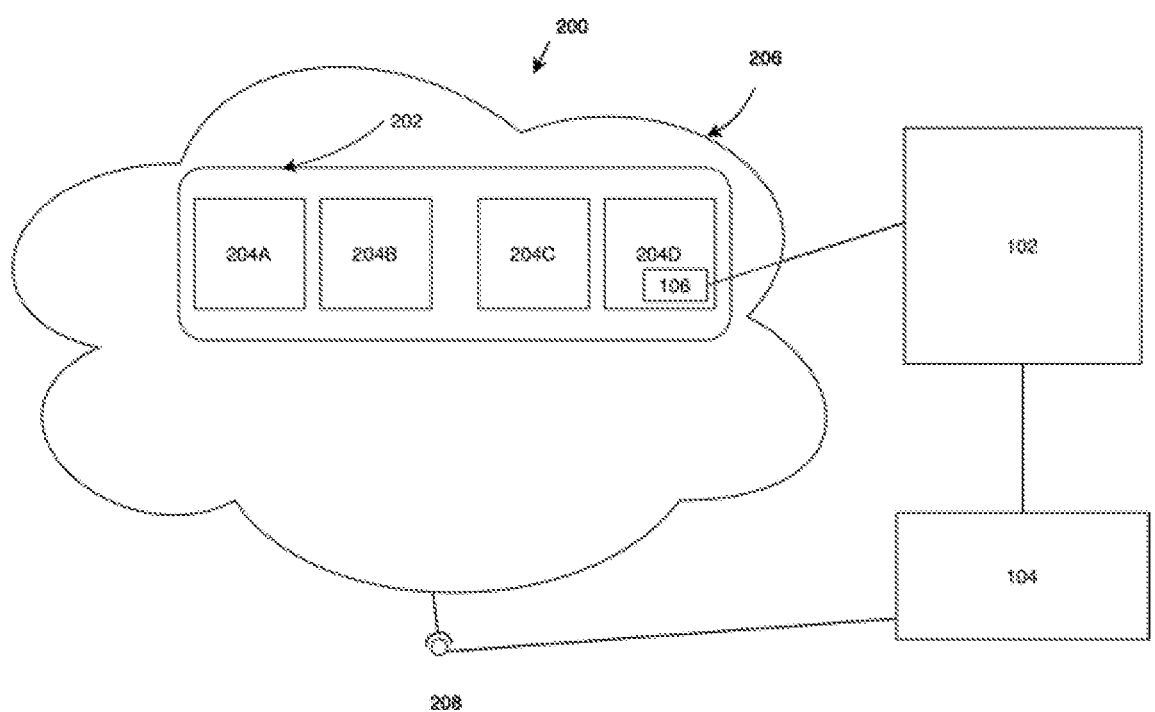
FIG. 2 shows a single tenant implementation of the invention.

A single-tenant backup system 200 is shown in FIG. 2. Tenant 202 owns virtual machines 204A, 204B, 204C, and 204D in public cloud 206. The system includes backup management service 102 and first backup agent 104, with backup management service 102 in communication with second backup agent 106 residing inside tenant virtual machine 204C. First backup agent 104 is in communication with tenant virtual machines 204A-D by way of public cloud API 208. First backup agent 104 coordinates with second backup agent 106 to create backups which are stored by first backup agent 104.

Figure 3:
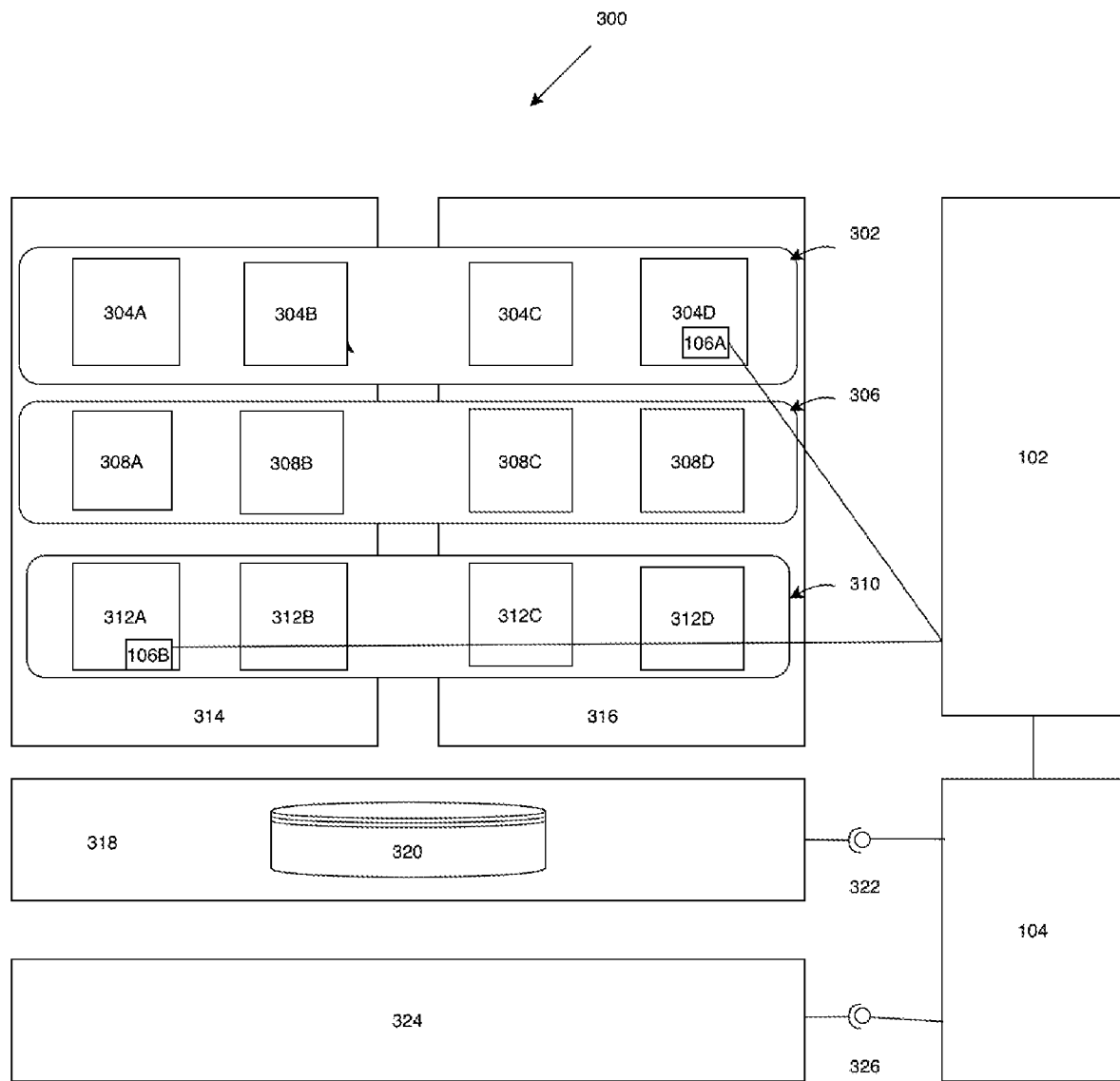
FIG. 3 shows a multi tenant-implementation of the invention.

A multiple-tenant backup system 300 is shown in FIG. 3. First tenant 302 owns virtual machines 304A-D, while second tenant 306 owns virtual machines 308A-D, and third tenant 310 owns virtual machines 312A-D. The tenants' virtual machines are distributed over hypervisors 314, 316 in this example. Although two are shown, any number of hypervisors could be used.

The system is preferably configured so that the second backup agent 106, such as the backup agent 106A in the third tenant's virtual machine 312A has no access to a storage system or other virtual machines. This increases system security by compartmentalization. Further, second backup agent 106 can work with encrypted data blocks that other system elements cannot decrypt. For example, the second backup agent 106A inside virtual machine 312A can send encrypted data blocks to storage with enhanced security as a result of only being able to be decrypted locally by second backup agent 106A.

In the multi-tenant system shown in FIG. 3, storage 318 with virtual machine images 324 is in communication with first backup agent 104 by way of storage API 322. First backup agent 104 is also in communication with virtualization management platform 324 by way of host API 326. In this embodiment, virtualization management platform 324 acts as a shared host for hypervisors 314, 316, and multiple virtual machines owned by tenants 302, 306, and 310. Virtual machine images 320 are isolated from the tenant virtual machines, allowing for compartmentalization of the backup images, which are not accessible directly by the tenant virtual machines.

Second backup agent 106 is preferably a lightweight backup agent compared to first backup agent 104. Having a lightweight backup agent inside a virtual machine saves disk, CPU, and RAM resources during backup so that system performance is not adversely affected by backup operations. This is especially important in production environments.

For example, a lightweight backup agent can dump only a small amount of data, such as database table structure, primary key tables, or configuration files. This prevents a negative effect on performance caused by a full database dump carried out by a full-featured backup agent. A lightweight backup agent also reduces CPU load dramatically by operating with megabytes of data instead of the gigabytes of data typically required by a full backup. A full backup of websites and web-hosting panels, including configuration files, webpages, scripts, media data, and style sheets loads the resources available inside a virtual machine, but the lightweight backup agent takes up significantly less resources by storing only file-system meta-data and particular files required for continuous application availability. The lightweight backup agent's reduced functionality allows the second backup agent 106 to occupy several times less RAM in memory. Further, less free disk space is needed to store cache data and the lightweight backup agent will be loaded faster and with less chance of conflicts with other applications.

First and second backup agents 104, 106 work together to create efficiencies for the system as a whole. For example, when the two backup agents work separately, a virtual machine may be restored either fully or granularly, but there will be no ability to finetune restore settings because the two backup agents are not synchronized or correlated. Further, the storage space required by two separate agents will include some amount of duplicated data, resulting in inefficiencies. A system with two separate agents will also require distinct sets of tasks and policies for scheduling and running backups.

Figure 4:
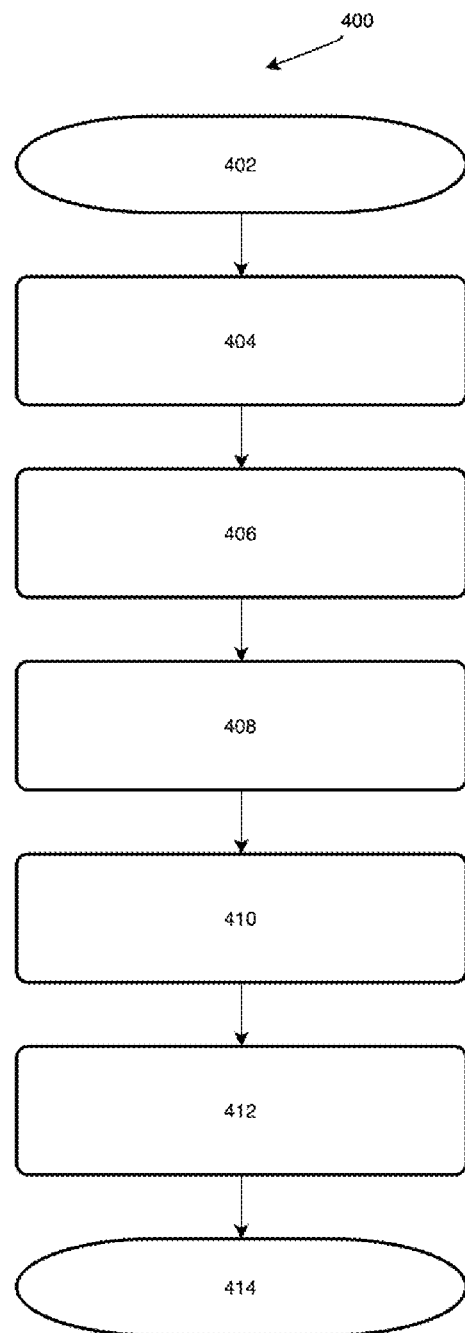
FIG. 4 shows a process for granular restoration of a virtual machine.

Restore process 400 for restoring a virtual machine using distributed backup agents is shown in FIG. 4. In this process, first backup agent 104 acts as a backup service and second backup agent 106 acts as lightweight backup agent.

The process begins when a restore task is initiated at step 402. In this embodiment, the backup service receives a granular restore task at step 404. The backup service collates metadata related to the granular restore task with the appropriate backup archive to produce a granular restore archive at step 406. This granular restore archive is a combination of data and meta-data previously collected by the backup service and lightweight backup agent. The backup service plugs this granular restore archive into a virtual machine targeted for restoration at step 408. Then at step 410 the backup service sends a command to complete the restoration to the lightweight backup agent installed at the target virtual machine. At step 412, the lightweight backup agent receives the command and applies the granular restore archive to the target virtual machine. The restore task is then completed at step 414.

Figure 5:
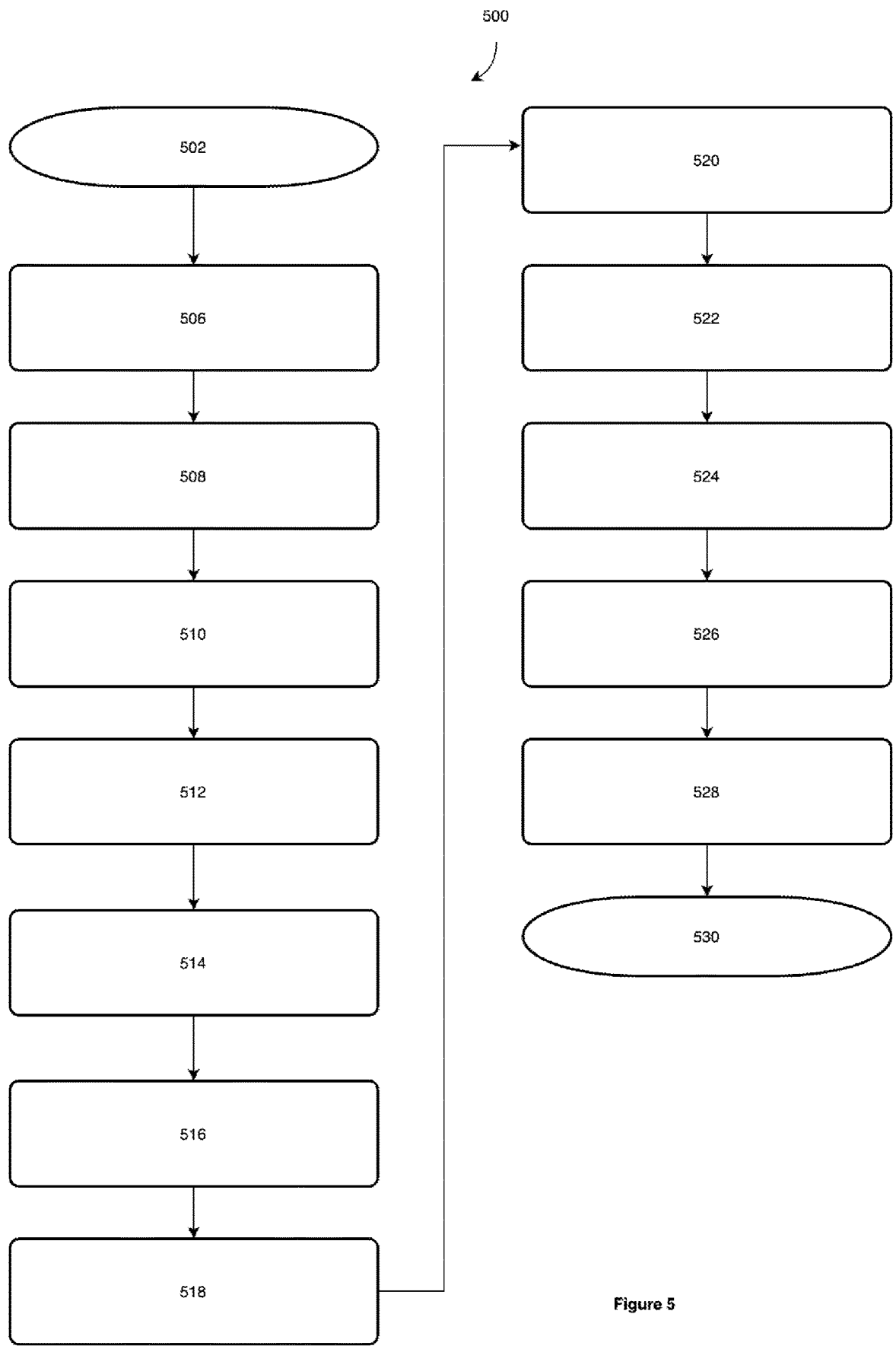
FIG. 5 shows a process for granular restoration of a virtual machine with optional fixes, services, and scripts.

FIG. 5 shows a restore process 500 with additional services by the lightweight backup agent. In this process, first backup agent 104 acts as a backup service and second backup agent 106 acts as lightweight backup agent. At step 502 the backup service receives a granular restore task. The backup service collates metadata related to the granular restore task with the appropriate backup archive to produce a granular restore archive at step 506. This granular restore archive is a combination of data and meta-data previously collected by the backup service and lightweight backup agent. The backup service captures a snapshot of the target virtual machine at step 508. The backup service merges the granular restore archive with the captured snapshot to create a restored virtual machine snapshot at step 510. Then at step 512 the backup service converts the restored virtual machine snapshot to an image suitable for restoring the target virtual machine. The backup service restores the target virtual machine with the image at step 514. To complete the granular restoration of the target virtual machine, the backup service sends a command to the lightweight backup service at step 516. The lightweight backup agent receives the command at step 518. After receiving the command, the lightweight backup agent takes one or more optional steps. For example, the lightweight backup agent installs software at step 520 if needed. The lightweight backup agent may also modify registry keys (step 522), modify configuration files (step 524), perform custom scripts (step 526), or decrypt data (step 528). After the lightweight backup agent has completed its work, the granular restore task is completed at step 530.

Figure 6:
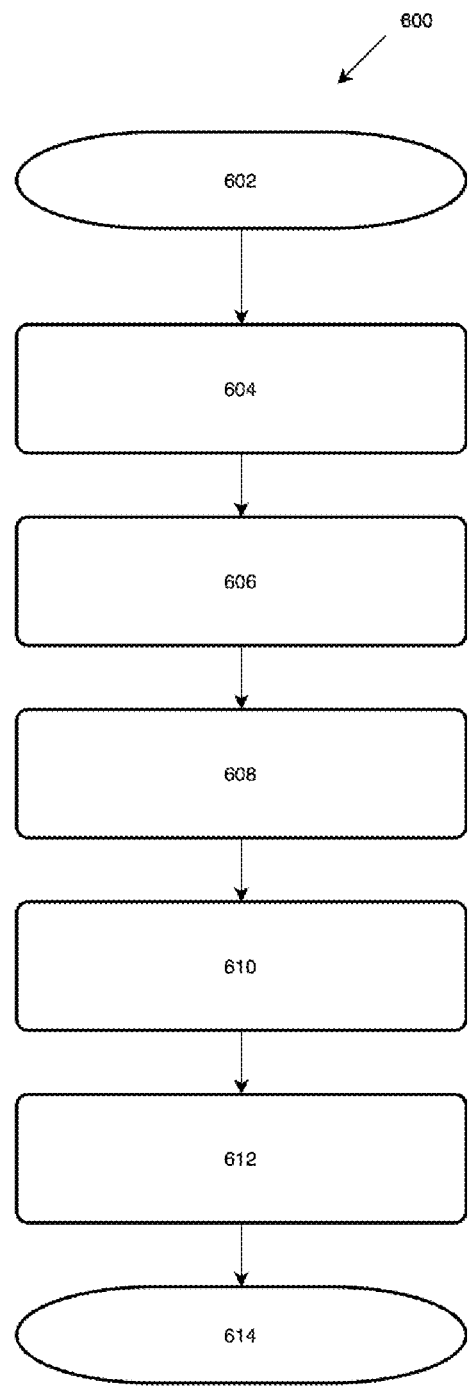
FIG. 6 shows a process for granular restoration involving getting data from a backup service and connecting a backup archive as a virtual disk or by way of a network connection.

Restore process 600 for restoring a virtual machine using distributed backup agents is shown in FIG. 6. In this process, first backup agent 104 acts as a backup service and second backup agent 106 acts as lightweight backup agent.

The process begins when a restore task is initiated at step 602. In this embodiment, the backup service receives a granular restore task at step 604. The backup service collates metadata related to the granular restore task with the appropriate backup archive to produce a granular restore archive at step 606. This granular restore archive is a combination of data and meta-data previously collected by the backup service and lightweight backup agent. The backup service plugs this granular restore archive into a virtual machine targeted for restoration at step 608. Then at step 610 the backup service sends a command to complete the restoration to the lightweight backup agent installed at the target virtual machine. At step 612, the lightweight backup agent receives the command and applies the granular restore archive to the target virtual machine. The restore task is then completed at step 614.

Figure 7:
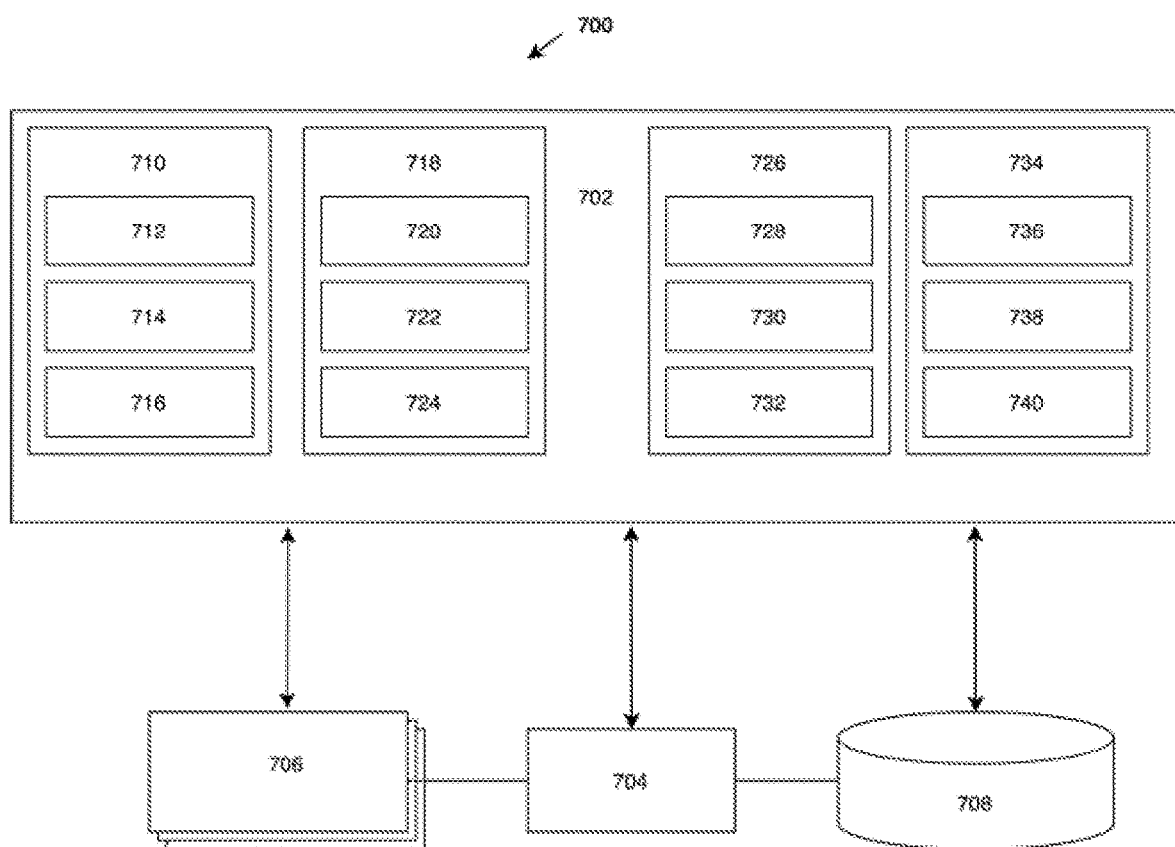
FIG. 7 shows an example of backup archive storage.

FIG. 7 shows backup system 700 with further details about backup management service 702. Backup management service 702 communicates with backup service 704, lightweight backup agents 706, and backup archive storage 708. Backup management service comprises task manager 710, which manages one or more tasks 712, 714, and 716. Backup management service 702 further comprises backup archive manager 718 storing backup slices 720, 722, 724, client manager 726 managing tenants 728, 730, 732), and policy manager 734 managing security policy 736, connection policy 738, and administration policy 738.

As shown in FIG. 7, backup management service 702 includes client manager 726 for managing tenants 728, 730, and 732. Client manager 726 is configured to keep used for its tasks, such as a list of tenants, tenant virtual machines, licenses, identifiers, inventory data, or other information.

Backup management service 102 also includes task manager 710. Task manager 710 creates, schedules, and orders tasks 712, 714, 716 and monitors task operations for managed tenants, tenant virtual machines, or particular applications or files. Task manager 710 identifies the scope of tasks and whether tasks must be started, postponed, or terminated. An administrator can create a task or store a backup of Apache Web Server or MS Exchange Server or another specific application. Backup management service 702 may also use task manager 710 to identify target virtual machines where granular backup is to be applied.

Backup management service 102 further includes policy manager 734 for managing internal service settings, such as agent to agent communication or agent to service communication. Other settings controlled by policy manager 734 include proxy settings, access rights, and security settings. Examples of security settings include encryption, malware detection, notarization, and the like.

Backup archive manager 718 acts within backup management 702 to manage backup slices 720, 722, 724 by searching for appropriate backups, identifying backup slices that are relatively more secure, stable, or relevant at the time when restoration is attempted. Backup archive manager 718 preferably uses meta-data collected by one or more lightweight backup agents to differentiate and select backup slices suitable for restoring a specific virtual machine at different points in time.

In FIG. 7, backup service 704 corresponds in function to first backup agent 104 described above; lightweight backup agents 706 correspond in function to second backup agent 106.

Backup archive storage 708 is a dedicated storage server or similar storage solution hosted in a computing environment. In one embodiment, backup data and meta-data are stored together in one place as a consistent archive. In an alternative embodiment, meta-data is stored separately from backup data while retaining some kind of connection to each other. For example, the meta-data includes links to backup data or the backup data includes links to meta-data. Alternatively, an additional component such as a database correlates the backup data and meta-data by way of links and identifiers. Preferably, system performance is improved by storing full meta-data for each backup slice. The backup system also supports incremental backup using less than complete meta-data.

The invention claimed is:

1. A computer-implemented method for restoring a system object of a target virtual machine using an outside backup agent located outside the target virtual machine and an inside backup agent, the inside backup agent installed on the target virtual machine, the method comprising:

the inside backup agent collecting target virtual-machine application metadata at the direction of the outside backup agent, and sending confirmation of readiness to the outside backup agent;

collating, with the outside backup agent, metadata related to a granular restore task with an appropriate backup archive to produce a granular restore archive;

wherein the granular restore archive is a combination of data previously collected by the outside backup agent and metadata previously collected by the inside backup agent;

the outside backup agent plugging the granular restore archive into the target virtual machine as a virtual disk;

sending a command from the outside backup agent to the inside backup agent to apply a granular restore archive to the target virtual machine;

wherein the inside backup agent does not store configuration files, webpages, scripts, media data, or style sheets of the target virtual machine; and wherein the inside backup agent stores only file-system metadata and particular files required for continuous application availability; and wherein the inside backup agent uses fewer system resources than are required by the outside backup agent.

2. The method of claim 1, wherein the backup agent captures a first virtual machine snapshot and merges the snapshot with the granular restore archive to create a restored first virtual machine snapshot.

3. The method of claim 1, wherein the outside backup agent converts a restored first virtual machine snapshot to an image formatted for restoring the target virtual machine.

4. The method of claim 2, wherein the outside backup agent restores the target virtual machine with a formatted image.

5. The method of claim 3, wherein the inside backup agent installs software on the target virtual machine.

6. The method of claim 3, wherein the inside backup agent modifies registry keys of the target virtual machine.

7. The method of claim 3, wherein the inside backup agent modifies configuration files of the target virtual machine.

8. The method of claim 3, wherein the inside backup agent performs custom scripts within the target virtual machine.

9. The method of claim 3, wherein the inside backup agent decrypts data of the target virtual machine.

10. The method of claim 3, wherein the inside backup agent restores a first virtual machine with metadata stored in a different location from the target virtual machine snapshot taken by the outside backup agent.

11. A system for restoring a consistent data backup, the system comprising:

a processor with a host running a guest virtual machine having one or more installed applications;

a storage medium outside the guest virtual machine for storing a snapshot of the guest virtual machine;

an outside backup agent installed outside the guest virtual machine and configured to make the snapshot of the guest virtual machine;

an inside backup agent installed inside the guest virtual machine and configured to collect metadata about other applications in the guest virtual machine defining a data structure and a system object state;

wherein the inside and outside backup agents are configured to communicate with each other;

wherein the outside backup agent is configured to issue commands to the inside-backup agent and the inside backup agent collects metadata upon command from the outside backup agent;

wherein metadata collected by the inside backup agent is linked with the snapshot made by the outside backup agent;

wherein the inside backup agent is not configured to store configuration files, webpages, scripts, media data, or style sheets of the target virtual machine:

and wherein the inside backup agent is configured to store only file-system metadata and particular files required for availability of one or more installed applications of the guest virtual machine; and wherein the inside backup agent requires fewer system resources than are required by the outside backup agent.

12. The system of claim 11 wherein the metadata collected by the inside backup agent is stored in a different location than the snapshot made by the outside backup agent.

\* \* \* \* \*